(12) United States Patent  
Martin (10) Patent No.: US 8,032,582 B2  
(45) Date of Patent: Oct. 4, 2011

(54) METHODS AND SYSTEM FOR DISTRIBUTING DATA TO TECHNICAL COMPUTING WORKERS

(75) Inventor: Jocelyn Luke Martin, Burwell (GB)

(73) Assignee: The MathWorks, Inc., Natick, MA (US)

( * ) Notice: Subject to any disclaimer, the term of this patent is extended or adjusted under 35 U.S.C. 154(b) by 260 days.

(21) Appl. No.: 11/891,462

(22) Filed: Aug. 10, 2007

(65) Prior Publication Data

US 2007/0276899 A1 Nov. 29, 2007

Related U.S. Application Data

(63) Continuation of application No. 11/195,927, filed on Aug. 2, 2005.

(51) Int. Cl.
*G06F 15/16* (2006.01)
*G06F 15/173* (2006.01)

(52) U.S. Cl. ........................................ 709/201; 709/226

(58) Field of Classification Search .......... 709/201–208, 709/217–35, 216–232
See application file for complete search history.

(56) References Cited

U.S. PATENT DOCUMENTS

| | | | |
|---|---|---|---|
| 4,980,857 A * | 12/1990 | Walter et al. ............ | 714/45 |
| 5,414,845 A | 5/1995 | Behm et al. | |
| 6,282,697 B1 | 8/2001 | Fables et al. | |
| 6,330,572 B1 * | 12/2001 | Sitka ...................... | 707/608 |
| 6,418,474 B1 | 7/2002 | Morris | |
| 6,622,268 B2 | 9/2003 | Holman | |
| 6,839,748 B1 | 1/2005 | Allavarpu et al. | |
| 7,047,475 B2 | 5/2006 | Sharma et al. | |
| 7,085,835 B2 * | 8/2006 | Bantz et al. ............ | 709/226 |
| 7,165,097 B1 | 1/2007 | Mackin et al. | |
| 7,231,437 B2 | 6/2007 | Boudnik et al. | |

(Continued)

FOREIGN PATENT DOCUMENTS

WO WO-01/14961 A2 3/2001

OTHER PUBLICATIONS

Husbands, Parry Jones Reginald, "Interactive Supercomputing," pp. 1-96 (1999).

(Continued)

*Primary Examiner* — Yasin Barqadle
(74) *Attorney, Agent, or Firm* — Nelson Mullins Riley & Scarborough LLP (57) ABSTRACT

A method and system is disclosed for providing a distributed technical computing environment for distributing technical computing tasks from a technical computing client to technical computing workers for execution of the tasks on one or more computers systems. Tasks can be defined on a technical computing client, and the tasks organized into jobs. The technical computing client can directly distribute tasks to one or more technical computing workers. Furthermore, the technical computing client can submit tasks, or jobs comprising tasks, to an automatic task distribution mechanism that distributes the tasks automatically to one or more technical computing workers providing technical computing services. The technical computing worker performs technical computing of tasks and the results of the execution of tasks may be provided to the technical computing client. Data associated with the tasks is managed by a programmable interface associated with a data storage repository. The interface allows the various entities of the distributed technical computing environment to access data services performable by the interface or by a file system or a database and database management system associated with the data.

32 Claims, 8 Drawing Sheets

U.S. PATENT DOCUMENTS

| | | | |
|---|---|---|---|
| 7,234,142 B1 * | 6/2007 | Uchibori | 718/102 |
| 7,406,632 B2 | 7/2008 | Sealey et al. | |
| 7,433,898 B1 | 10/2008 | Georgiev | |
| 7,457,914 B2 | 11/2008 | Cordella et al. | |
| 7,480,725 B2 | 1/2009 | Krajewski, III et al. | |
| 7,509,244 B1 | 3/2009 | Shakeri et al. | |
| 7,516,360 B2 * | 4/2009 | Bacher et al. | 714/12 |
| 7,533,141 B2 | 5/2009 | Nadgir et al. | |
| 7,640,547 B2 | 12/2009 | Neiman et al. | |
| 7,707,580 B2 * | 4/2010 | Kubota | 718/105 |
| 7,730,015 B1 | 6/2010 | Wahlig et al. | |
| 7,827,283 B2 | 11/2010 | Naik et al. | |
| 7,908,313 B2 | 3/2011 | Lurie et al. | |
| 2002/0019844 A1 | 2/2002 | Kurowski et al. | |
| 2002/0116248 A1 * | 8/2002 | Amit et al. | 705/9 |
| 2004/0088401 A1 * | 5/2004 | Tripathi et al. | 709/224 |
| 2004/0098447 A1 | 5/2004 | Verbeke et al. | |
| 2004/0133670 A1 * | 7/2004 | Kaminsky et al. | 709/224 |
| 2004/0181522 A1 | 9/2004 | Jardin | |
| 2004/0193679 A1 * | 9/2004 | Tecco et al. | 709/203 |
| 2004/0205048 A1 * | 10/2004 | Pizzo et al. | 707/3 |
| 2005/0050151 A1 | 3/2005 | Mitchell et al. | |

OTHER PUBLICATIONS

International Preliminary Report on Patentability for Application No. PCT/US2006/030225, dated Jan. 8, 2008.

* cited by examiner

| Technical Computing Client, 250 | Interface 190 | Automatic Task Distribution Mechanism, 260 | Technical Computing Worker, 270 |
|---|---|---|---|

METHODS AND SYSTEM FOR DISTRIBUTING DATA TO TECHNICAL COMPUTING WORKERS

RELATED APPLICATION

This application is a continuation of pending U.S. patent application Ser. No. 11/195,927 filed Aug. 2, 2005. The contents of the aforementioned patent application are incorporated herein in its entirety by reference.

TECHNICAL FIELD

The present invention generally relates to technical computing, and more particularly distributing technical computing processing to multiple computers in a network in a distributed technical computing environment.

BACKGROUND INFORMATION

MATLAB® is a product of The MathWorks, Inc. of Natick, Mass., which provides engineers, scientists, mathematicians, and educators across a diverse range of industries with an environment for technical computing applications. MATLAB® is an intuitive high performance language and technical computing environment that provides mathematical and graphical tools for mathematical computation, data analysis, visualization, and algorithm development. MATLAB® integrates numerical analysis, matrix computation, signal processing, and graphics in an easy-to-use environment where problems and solutions are expressed in familiar mathematical notation, without traditional programming. MATLAB® is used to solve complex engineering and scientific problems by developing mathematical models that simulate the problem. A model is prototyped, tested and analyzed by running the model under multiple boundary conditions, data parameters, or just a number of initial guesses. In MATLAB®, one can easily modify the model, plot a new variable or reformulate the problem in a rapid interactive fashion that is typically not feasible in a non-interpreted programming such as Fortran or C.

As a desktop application, MATLAB® allows scientists and engineers to interactively perform complex analysis and modeling in their familiar workstation environment. However, a single workstation can be limiting to the size of the problem that can be solved, because of the relationship of the computing power of the workstation to the computing power necessary to execute computing intensive iterative processing of complex problems in a reasonable time.

For example, a simulation of a large complex aircraft model may take a reasonable time to run with a single computation with a specified set of parameters. However, the analysis of the problem may also require the model be computed multiple times with a different set of parameters, e.g., at one-hundred different altitude levels and fifty different aircraft weights, to understand the behavior of the model under varied conditions. This would require five-thousand computations to analyze the problem as desired and the single computer would take an unreasonable or undesirable amount of time to perform these simulations. In this case, the single computer would be allocated full-time to performing the computation while many computer resources on the network may be idle. Additionally, the benefit of the interactive features of the software is reduced as the computation time increases.

With many engineering and scientific problems requiring larger and more complex modeling, computations accordingly become more resource intensive and time-consuming. When a computation becomes so large and complex that it cannot be completed in a reasonable amount of time on a single computer, distributed computing in a distributed technical computing environment, for example Distributed Computing Toolbox for MATLAB® and MATLAB® Distributed Computing Engine, provides a solution to decrease the computation time as needed.

In such distributed technical computing environments, a scheduler, such as a load sharing facility (LSF), a portable batch system (PBS), a high-throughput computing (HTC) environment, such as Condor, Microsoft Cluster Manager, and the like, manage distribution of tasks within the distributed technical computing environment. Although such schedulers distribute tasks to the various computational devices in the distributed technical computing environment, the data associated with such tasks is stored in a shared file system accessible to those computational devices. This severely limits the types of clients and workers that can work with Distributed Computing Toolbox. Moreover, this limits the abilities of programs using the scheduler, to the capabilities of the file system with respect to being informed of changes and other events. Still further, it requires the data validation occur in the process generating the file. Accordingly, there exists a need to improve the management and handling of data associated with distributed tasks in the distributed technical computing environment.

SUMMARY OF THE INVENTION

The present invention provides methods and a system for managing distribution of data associated with distributed technical computing tasks in a distributed technical computing environment. A technical computing client may define a job comprising one or more tasks. The technical computing client through an intermediary such as a scheduler can distribute these tasks to technical computing workers for technical computing of the task. The technical computing workers perform technical computing of the task and may provide a result of the task for the technical computing client. An interface associated with a data repository holding the data allows programmatic control of the interface and provides a mechanism for informing interested entities of desired data events and for performing other data operations, for example, ensuring data integrity. As such, the present invention improves the ability of a scheduler associated with the distributed technical computing environment to manage and distribute tasks amongst multiple computing resources to perform technical computing of tasks. Further, the present invention is well suited for use with a number of different data repository types. Suitable data repository types include, but are not limited to a file system, a database, a remote storage array, memory, and the like.

In one illustrative embodiment of the present invention, a method of transferring data from a first computational engine to a second computational engine in a distributed environment having a plurality of computational engines is disclosed. Performance of the method instructs an interface associated with a data repository to transfer to the second of the computational engines data associated with a task distributed from the first of the computational engines. Upon processing of the instructions, the interface transfers the data from the interface to the second of the computational engines. Performance of the method communicates with the interface to establish a communications channel with the data repository.

Instructing the interface can invoke a method of the interface to perform a pre-defined operation. The method can take an action to notify an entity of receipt of the data by the interface. The method can take an action to maintain integrity of the data. The method can also take an action to update a data structure held by the data repository.

The method of taking an action to update a data structure can include the step of sending a query language command to a database management system managing the data structure. Additionally, the method of taking an action to update a data structure can include the step of calling a function associated with the interface.

The distributed environment can be a distributed technical computing environment.

In another illustrative embodiment of the present invention, a system for distributing data in a distributed environment is disclosed. The system includes amongst other items, a first computational engine, a data storage mechanism, and an interface. The first computational engine is configured to submit a task to distribute for processing in the computing environment. The task includes at least one action to perform by the computing environment. The data storage mechanism is configured to hold data associated with the task in communication with the computing environment. The interface is configured to manage transfer of the data associated with the task between the data storage mechanism and a second computational engine performing the processing in the computing environment.

The system can further include an automatic task distribution mechanism in communication with the first computational engine. The automatic task distribution mechanism receives the task submitted by the first computational engine and makes the task available to one or more other computational engines associated with the computing environment.

In one embodiment of the system, the interface can manage transfer of the data by notifying selected entities associated with the computing environment of an event relating to the data, the task, or both. The event can include one of a change in a data value, a change in a data type, a change in a dimension of the data, receipt of the data by the interface, transfer of the data from the interface to one of the computational engines, or other like events.

In another embodiment of the system, the interface can manage transfer of the data by providing data integrity. In other embodiments, the interface performs other management operations and functions to manage distribution of data in the computing environment. In one embodiment of the system, the computing environment is a distributed technical computing environment.

In one embodiment of the present invention, a computer readable medium holding computer executable instructions for performing a method of transferring data from a first computational engine to a second computational engine in a distributed environment having a plurality of computational engines is disclosed. Execution of the instructions instructs an interface associated with a data repository to transfer to the second of the computational engines data associated with a task distributed from the first of the computational engines. The interface in turn transfers the data from the interface to the second of the computational engines.

Additionally, execution of the instructions causes a computer to communicate with the interface to establish a communications channel with the data repository.

In one embodiment of the present invention, instructing the interface invokes a method of the interface to perform a pre-defined operation. In one instance, the method performs the step of taking an action to notify an entity of receipt of the data by the interface. In another instance, the method performs the step of taking an action to maintain integrity of the data. In still another instance, the method performs the step of taking an action to update a data structure held by the data repository.

The step of taking an action to update the data structure held by the data repository includes the step of sending a query language command to a database management system managing the data structure. In another instance, the step of taking an action to update the data structure held by the data repository includes the step of calling a function associated with the interface. The distributed environment can include a distributed technical computing environment.

BRIEF DESCRIPTION OF THE DRAWINGS

The foregoing and other objects, aspects, features, and advantages of the invention will become more apparent and may be better understood by referring to the following description taken in conjunction with the accompanying drawings, in which.

DETAILED DESCRIPTION

The illustrative embodiment of the present invention provides programmatic control of an interface connecting computational devices in a distributed technical computing environment to data held by a data repository associated with the distributed technical computing environment. Programmatic control of the interface allows the distributed technical computing environment to improve management of distributed tasks and associated data. The interface provides the distributed technical computing environment with the capability of, amongst other things, notifying entities of the distributed technical computing environment when a predefined data event occurs with data associated with a task in the distributed technical computing environment. Consequently, the interface improves the ability of a scheduler associated with the distributed technical computing environment to manage distribution of tasks and associated data amongst the computational devices of the distributed technical computing environment.

Moreover, the illustrative embodiment of the present invention is configurable to work with a variety of data repositories such as, a database, a storage array, and the like. It is not limited to a shared file system. Further, the programmatic control of an interface connecting computational devices in a distributed technical computing environment to data held by a data repository associated with the distributed technical computing environment provided by the illustrative embodiment of the present invention is well suited to work with a number of different schedulers. For example, schedulers such as LSF, PBS, HTC type schedulers, such as Condor, Microsoft Cluster Manager, and the like.

Before continuing with the discussion below, it is helpful to first define a few terms used herein.

The term "task" or "tasks" can be declared on a computational device in a distributed environment and defines a command, such as a MATLAB® command, to be executed, and the number of arguments and any input data to the arguments. A task can be directly distributed by the technical computing client to one or more technical computing workers. A technical computing worker performs technical computing on a task and may return a result to the technical computing client. Additionally, a task or a group of tasks, in a job, can be submitted to an automatic task distribution mechanism to distribute the one or more tasks automatically to one or more technical computing workers providing technical computing services. The technical computing client does not need to specify or have knowledge of the technical computing workers in order for the task to be distributed to and computed by a technical computing worker. Tasks can be organized into jobs.

The term "job" refers to a logical unit of activities, or tasks that are processed and/or managed collectively, such as a group of one or more tasks.

The term "automatic task distribution mechanism" or "scheduler" refers to a mechanism that can distribute tasks to technical computing workers that are anonymous to any technical computing clients. The technical computing workers perform the task and may return as a result the output data generated from the execution of the task. The result may be returned to a data repository, which, in turn, the interface of the present invention may provide the result to the technical computing client.

As used herein, the term "data repository" refers to a data structure suitable for holding data. Such suitable structures include, but are not limited to, a file system, a database and associated database management system (DBMS), memory, and the like.

As used herein, the term "pre-defined data event" or "data event" refers to an action, occurrence or non-occurrence to data of concern to a member or entity of the distributed technical computing environment and to an action, occurrence, or non-occurrence to a task or job. Such actions, occurrences, or non-occurrence can include, but are not limited to a read operation to read the data from the data repository, a write operation to write the data to the data repository, a save operation to save the data to the data repository, receipt of the data by an entity of the distributed technical computing environment, forwarding or transmission of the data by entity of the distributed technical computing environment, an operation performed on or with the data by an entity of the distributed technical computing environment, reporting on the progress of a task or job, and the like.

As used herein, the term "storage device" refers to a server or other electronic device capable of storing data. The storage device can store the data in any type of memory, on a magnetic disk or tape, on an optical type disk, or any combination thereof.

As used herein the term "computational engine" refers to a hardware device or multiple hardware devices capable of performing instructions in a defined manner. A computational engine or computational engines may be co-located on a single hardware device such as a microprocessor or controller having multiple cores or multiple threads or may be configured as multiple hardware devices interconnected by a serial or parallel bus interconnection structure.

As used herein the term "computational device" refers to a system on which a computational engine or computational engines reside. A computational device can include one or more computational engines. The illustrative embodiment of the present invention is described solely for illustrative purposes relative to a distributed computing with MATLAB® technical computing environment, which includes Distributed Computing Toolbox for MATLAB® and MATLAB® Distributed Computing Engine. Those skilled in the art will appreciate the Distributed Computing Toolbox for MATLAB® and a client and client machine can be used to define and submit a task, tasks, job or jobs for execution and the MATLAB® Distributed Computing Engine executes the task, tasks, job or jobs on a worker machine such as a technical computing worker. Although the illustrative embodiment of the present invention is described relative to a distributed computing with MATLAB® based application, one of ordinary skill in the art will appreciate that the present invention may be applied to distributing the processing of technical computing tasks with other technical computing environments, such as technical computing environments using software products of LabView® or MATRIXx from National Instruments, Inc., or Mathematica® from Wolfram Research, Inc., or MathCAD of Mathsoft Engineering & Education Inc., or Maple™ from Maplesoft, a division of Waterloo Maple Inc., or Octave.

Figure 1A:
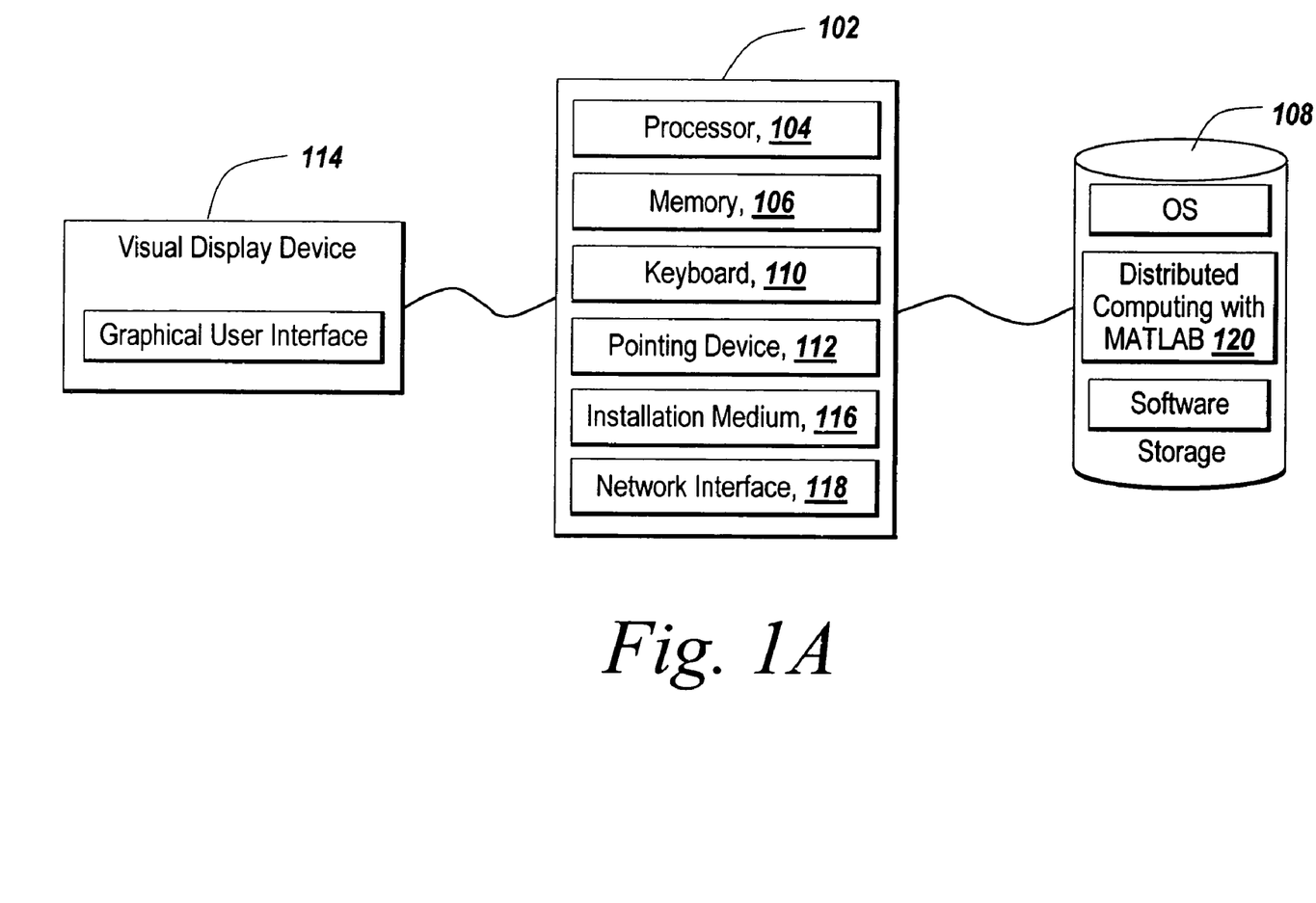
FIG. 1A is a block diagram of a computing device for practicing an embodiment of the present invention.

FIG. 1A depicts a client machine suitable for practicing an illustrative embodiment of the present invention. The client machine 102 includes memory 106, on which software according to one embodiment of the present invention may be stored, a processor (CPU) 104 for executing software stored in the memory 106, and other programs for controlling system hardware. Although an illustrative embodiment of the present invention is discussed below in relation to, a distributed, environment associated with a network this is not limiting of the present invention for the concepts and technical features discussed herein are equally applicable to distributed environments that may not be associated with a network. That is, the client machine 102 is configurable as a tightly coupled multiple processor system or the processor 104 can be a processor type having multiple cores. As such, in a tightly coupled environment, a task or tasks are distributed amongst the multiple processors or amongst the multiple cores using a bus or multiple bus structures. Accordingly, as discussed below a network 140 and a network communication channel 130 are analogous to multiple processors and a bus or other interconnection structure, such as conductive paths formed in or on a printed circuit board, that interconnect the multiple processors or interconnect multiple cores of a processor.

The memory 106 may comprise a computer system memory or random access memory such as DRAM, SRAM, EDO RAM, etc. The memory 106 may comprise other types of memory as well, or combinations thereof. A human user may interact with the client machine 102 through a visual display device 114 such as a computer monitor, which may render a graphical user interface (GUI). The client machine 102 may include other I/O devices such a keyboard 110 and a pointing device 112, for example a mouse, for receiving input from a user. Optionally, the keyboard 110 and the pointing device 112 may be connected to the visual display device 114. The client machine 102 may include other suitable conventional I/O peripherals. The client machine 102 may support any suitable installation medium 116, a CD-ROM, floppy disks, tape device, USB device, hard-drive or any other device suitable for installing software programs such as Distributed computing with MATLAB® 120. The client machine 102 may further comprise a storage device 108, such as a hard-drive or CD-ROM, for storing an operating system and other related software, and for storing application software programs such as Distributed computing with MATLAB® 120 of the present invention. Additionally, the client machine 102 may include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above. The network interface 118 may comprise a built-in network adapter, network interface card, PCMCIA network card, card bus network adapter, wireless network adapter, USB network adapter, modem or any other device suitable for interfacing the computing device 118 to any type of network capable of communication and performing the operations described herein. Moreover, the client machine 102 may be any computer system such as a workstation, desktop computer, server, laptop, handheld computer or other form of computing or telecommunications device that is capable of communication and that has sufficient processor power and memory capacity to perform the operations described herein.

Figure 1B:
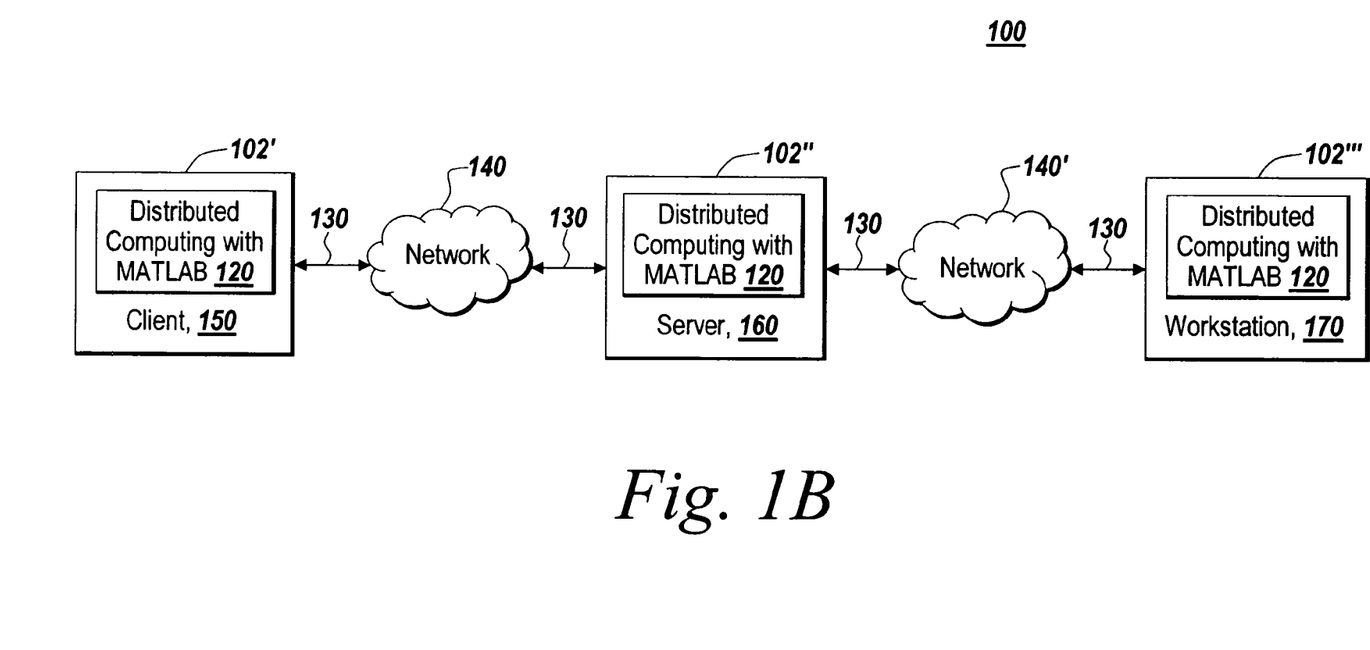
FIG. 1B is a block diagram of a distributed computing system for practicing an illustrative embodiment of the present invention.

FIG. 1B depicts an environment suitable for practicing an illustrative embodiment of the present invention, where the functionality of Distributed computing with MATLAB® 120 is distributed across multiple client machines (102', 102" and 102'''). In a broad overview, the system 100 depicts a multiple-tier or "n-tier" networked computer system for performing distributed software applications such as the distributed technical computing environment of the present invention. The system 100 includes a client 150 (e.g., a first client machine 102') in communications through a network communication channel 130 with a server computer 160, also known as a server, (e.g., a second client machine 102") over a network 140 and the server in communications through a network communications channel 130 with a workstation (e.g., a third client machine 102''') over the network 140'. The client 150, the server 160, and the workstation 170 can be connected 130 to the networks 140 and/or 140' through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above. Each of the client 150, server 160 and workstation 170 can be any type of client machine (102', 102" and 102''') as described above and respectively configured to be capable of computing and communicating the operations described herein.

In one embodiment, each of the client 150, server 160 and workstation 170 are configured to and capable of running at least a portion of the Distributed computing with MATLAB® 120. As a distributed software application, Distributed computing with MATLAB® has one or more software components that run on each of the client 150, server 160, and workstation 170, respectively, and work in communication and in collaboration with each other to meet the functionality of the overall application. For example, the client 150 may hold a graphical modeling environment that is capable of specifying block diagram models and technical computing tasks to analyze the model. The client 150 may have software components configured to and capable of submitting the tasks to the server 160 (i.e., Distributed Computing Toolbox for MATLAB®). The server 160 may have software components configured to and capable of receiving the tasks submitted by the client 150 and for determining a workstation 170 to assign the task for technical computing. The workstation 170 may hold software components capable of providing a technical computing environment to perform technical computing of the tasks assigned from the server 160 and submitted by the client 150 (i.e., MATLAB® Distributed Computing Engine). In summary, the technical computing environment and software components of the Distributed computing with MATLAB® 120 application may be deployed across one or more different computing devices in various network topologies and configurations.

Figure 2A:
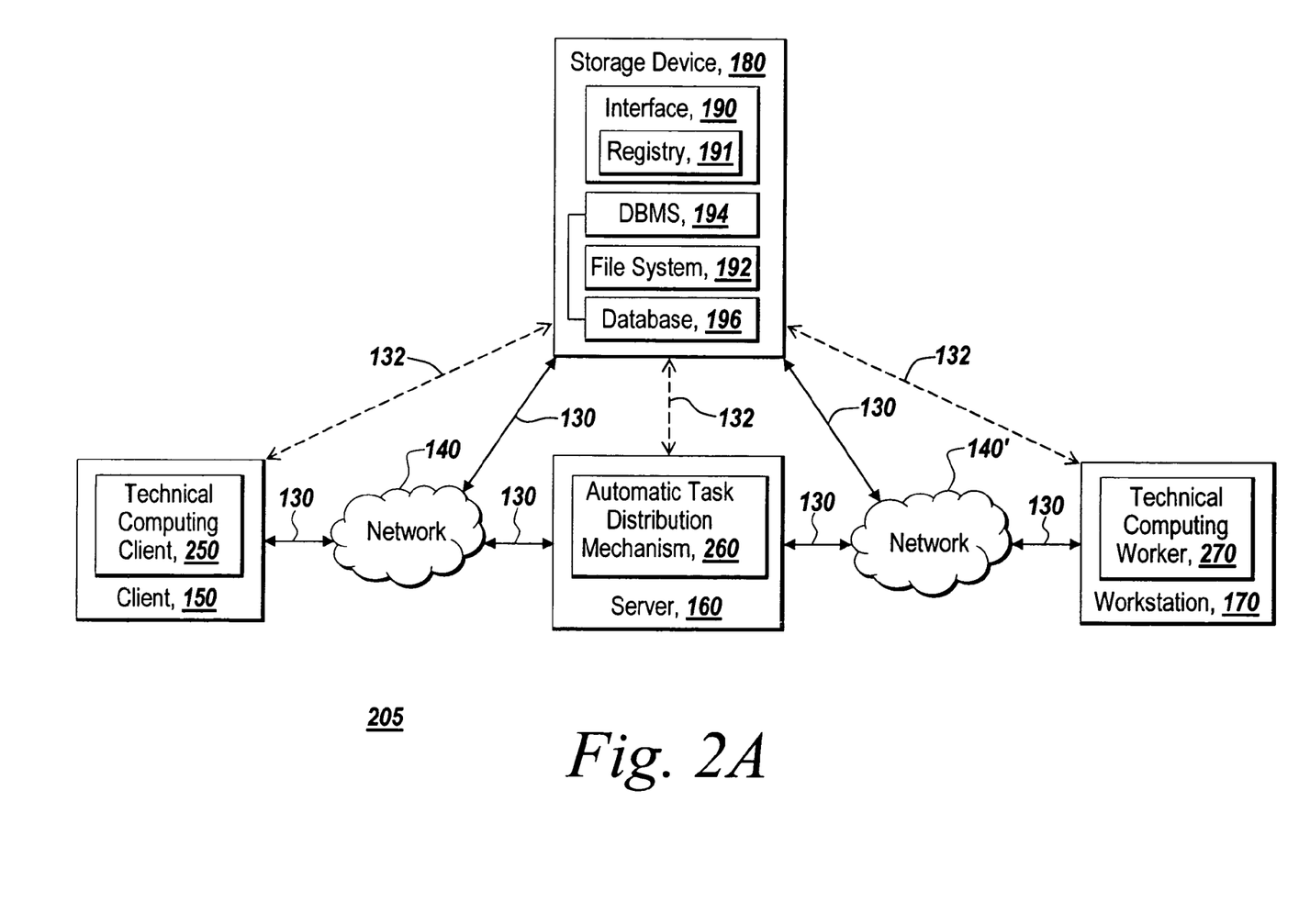
FIG. 2A is a block diagram of the components of an alternative embodiment of the present invention in a multi-tier networked computer system.

FIG. 2A depicts an illustrative embodiment of the Distributed computing with MATLAB® system suitable for use in connection with the present invention in a multi-tier distributed computer system. The technical computing client 250 can be a technical computing software application that provides a technical computing and graphical modeling environment for generating block diagram models and to define mathematical algorithms for simulating models. The technical computing client 250 can be a Distributed Computing Toolbox for MATLAB® client, which may include all or a portion of the functionality provided by the standalone desktop application of MATLAB®. Additionally, the technical computing client 250 can be any of the software programs available in the MATLAB® product family. Furthermore, the technical computing client 250 can be a custom software program or other software that accesses Distributed Computing Toolbox for MATLAB® functionality via an interface, such as an application programming interface, or by other means. One ordinarily skilled in the art will appreciate the various combinations of client types that may access the functionality of the system.

With an application programming interface and/or programming language of the technical computing client 250, functions can be defined representing a technical computing task to be executed by either a technical computing environment local to the client computer 150, or remote on the workstation 170. The local technical computing environment may be part of the technical computing client 250, or a technical computing worker running on the client computer 150. The programming language includes mechanisms, described below in more detail, to define a task to be distributed to a technical computing environment and to communicate the task to the technical computing worker 270 on the workstation 170, or alternatively, on the client 150. For example, the technical computing client 250 may declare a function to generate a random set of ten numbers and further delegate that the technical computing worker 270 running on the workstation 170 execute the function. Also, the application programming interface and programming language of the Distributed Computing Toolbox for MATLAB® running on technical computing client 250 includes mechanisms, described in more detail below, to receive a result from the execution of technical computing of the task from another technical computing environment. For example, the technical computing client 250 may declare a variable to hold a result returned from the technical computing worker 270 performing technical computing of the random generation function or the technical computing client 250 can identify one or more locations within a file system or database to hold the results returned from the technical computing worker 270.

The distributed functionality features of the programming languages of Distributed Computing Toolbox for MATLAB® on the technical computing client 250 allows the technical computing client 250 to use the computing resources that may be available from a technical computing worker 270 on the workstation 170 to perform technical computing of the task. This frees up the technical computing client 250 to perform other tasks, or the client computer 150 to execute other software applications.

The technical computing worker 270 of the system 205 can be a technical computing software application that provides a technical computing environment for performing technical computing of tasks, such as those tasks defined or created by the technical computing client 250. The technical computing worker 270 can be a MATLAB® Distributed Computing Engine application, module, service, software component, or a session, which includes support for technical computing of functions defined in the programming language of MATLAB®. A session is an instance of a running technical computing worker 270 by which a technical computing client can connect and access its functionality. The technical computing worker 270 can include all the functionality and software components of the technical computing client 250, or it can just include those software components it may need to perform technical computing of tasks it receives for execution. The technical computing worker 270 may be configured to and capable of running any of the modules, libraries, or software components of the MATLAB® product family. As such, the technical computing worker 270 may have all or a portion of the software components of MATLAB® installed on the workstation 170, or alternatively, accessible on another system in the network 140. The technical computing worker 270 has mechanisms, described in detail later, to receive a task distributed from the technical computing client 250. The technical computing worker 270 is capable of performing technical computing of the task as if the technical computing client 250 was performing the technical computing in its own technical computing environment. The technical computing worker 270 also has mechanisms, to return a result generated by the technical computing of the task to the technical computing client 250.

The technical computing worker 270 can be available on an as needed basis to the technical computing client 250. When not performing technical computing of tasks from the technical computing client 250, the workstation 170 of the technical computing worker 270 can be executing other software programs, or the technical computing worker 270 can perform technical computing of tasks from other technical computing clients. The multi-tier distributed system 205 includes a technical computing client 250 running on a client computer 150 in communications over a network communication channel 130 to a server 160 and to a storage device 180 on a network 140. The server 160 comprises an automatic task distribution mechanism 260. The storage device 180 includes an interface 190, and a file system 192, a database management system 194 and an associate database 196, or both. The interface 190 receives communications, such as data and instructions from the technical computing client 250, the automatic task distribution mechanism 260, and the technical computing worker 270, to connect each entity to the file system 192 and the database management system 194. The technical computing client 250, the automatic task distribution mechanism 260, and the technical computing worker 270 can communicate with the interface 190 on a dedicated communication line 132 or via network 140, or network 140', over the network communication channel 130. The interface 190 can also send or forward communications, such as data and instructions to the technical computing client 250, the automatic task distribution mechanism 260, and the technical computing worker 270 to, amongst other things, connect each entity to the file system 192 and the database management system 194.

The automatic task distribution mechanism 260 communicates over a network communication channel 130 on the network 140 to the technical computing worker 270 on the workstation 170.

The automatic task distribution mechanism 260 comprises one or more software components to provide for the automatic distribution of tasks from the technical computing client 250 to the technical computing worker 270. The automatic task distribution mechanism 260 allows the technical computing client 250 to delegate the management of task distribution to the automatic task distribution mechanism 260. For example, with the programming language of Distributed Computing Toolbox for MATLAB®, a task can be defined and submitted to the automatic task distribution mechanism 260 without specifying which technical computing worker 270 is to perform the technical computing of the task. The technical computing client 250 does not need to know the specifics of the technical computing worker 270.

The technical computing client can define a function to submit the task to the automatic task distribution mechanism 260 and get a result of the task from the automatic task distribution mechanism 260. As such, the automatic task distribution mechanism provides a level of indirection between the technical computing client 250 and the technical computing worker 270.

The interface 190 includes one or more software components to provide connectivity between the technical computing client 250, the technical computing worker 270, the automatic task distribution 260, the file system 192, and the database management system 194. The interface 190 is able to monitor and manage the transfer of data associated with tasks between any or all of the technical computing client 250, the technical computing worker 270, and the storage device 180. The associated data can be a result or results from a task performed by the technical computing worker 270, or data needed by the technical computing worker 270 to complete a task requested by the technical computing client 250.

The interface 190 can operate and perform tasks in a platform-independent manner using the concept of a virtual machine to help avoid cross-platform compatibility issues should the client 150 be a first platform and the workstation 170 a second platform different from the first. For example, the client 150 can be a Windows-based platform, and the workstation 170 can be a UNIX-based platform. Those skilled in the art will appreciate that other suitable platforms exist, for example, DOS-based platform, Solaris-based platform, Mac-based platform, Linux-based platform, and the like.

The platform-independent nature of the interface 190 allows the technical computing client 250, the technical computing worker 270 and if desired the automatic task distribution mechanism 260 to access the file system 192 and the database 196 either directly or indirectly, for example, through the database management system 194 regardless of cross-platform compatibility issues that may exist between the various entities in the distributed technical computing environment 205. In one embodiment of the present invention, the interface 190 encodes access request statements in structured query language (SQL), and passes them to the database management system 190 to perform a desired method. Such methods can include, but are not limited to, creating tables, modifying tables, reading data, writing data, comparing data to earlier data versions, providing data integrity to ensure the entities of the distributed technical computing environment 205 perform tasks in a manner to avoid the use of or creation of corrupted data and other like methods. In another embodiment of the present invention, the interface 190 abstracts file system dependencies associated with file system 192 to provide data from the file system 192 in a format understandable by the technical computing client 250 or the technical computing worker 270. Further, the technical computing client 250 and the technical computing worker 270 are each able to interact with the file system 192 and the database 196 with API calls to the interface 190.

The interface 190 can include a registry 191 to allow entities of the distributed technical computing environment 205 to register with the interface 190 to receive notice of an occurrence of one or more pre-defined data events. Such pre-defined data events include, but are not limited to, receipt of data at the interface 190 from the technical computing client 250; receipt of data at interface 190 from the technical computing worker 270; transmission of data from the interface 190 to the technical computing worker 270; transmission of data from the interface 190 to the technical computing client 250; notice that one or more values in a data structure have changed; notice that the interface 190 did not receive data from the technical computing client 250; notice that the interface 190 did not receive data from the technical computing worker 270; notice that the interface 190 received incomprehensible data from the technical computing worker 270, for example, data of a wrong data type, format, length, and the like; notice that the interface 190 received incomprehensible data from the technical computing client 250; notice that the file system 192 or the database 196 is nearing storage capacity, and the like.

Entities of the distributed technical computing environment 205 can include, but are not limited to, the technical computing client 250, the automatic task distribution mechanism 260, and the technical computing worker 270. Further, entities can be software based or hardware based. The interface 190 eases the distributed programming and integration burden on the distributed technical computing environment 205. The interface 190 allows the automatic task distribution mechanism 260 to improve its ability of monitoring, managing, and distributing tasks among the computational devices of the distributed technical computing environment 205. Typically the tasks distributed by the automatic task distribution mechanism 260 identify a location in either the file system 192 or the database 196 of the data needed, to perform the task, or the location to place a result of the task. The automatic task distribution mechanism 260 manages distribution of tasks, but does not manage and monitor the distribution of data associated with the tasks. As such, with the addition of the interface 190, the automatic task distribution mechanism 260 can register with the registry 191 to help determine when tasks are complete and help determine which tasks are still being performed in an effort to improve load balancing of tasks among the various computational devices performing in the distributed technical computing environment 205.

Further, the interface 190 in combination with the automatic task distribution mechanism 260 eases the distributed programming and integration burden on the technical computing client 250. The technical computing client 250 does not need to have prior knowledge of the availability of the technical computing worker 270. For multiple task submissions from the technical computing client 250, the automatic task distribution mechanism 260 can manage and handle the delegations of the tasks to the same technical computing worker 270, or to other technical computing workers, and the storage device 180 can hold the results of the tasks on behalf of the technical computing client 250 for retrieval after the completion of technical computing of all the distributed tasks.

Figure 2B:
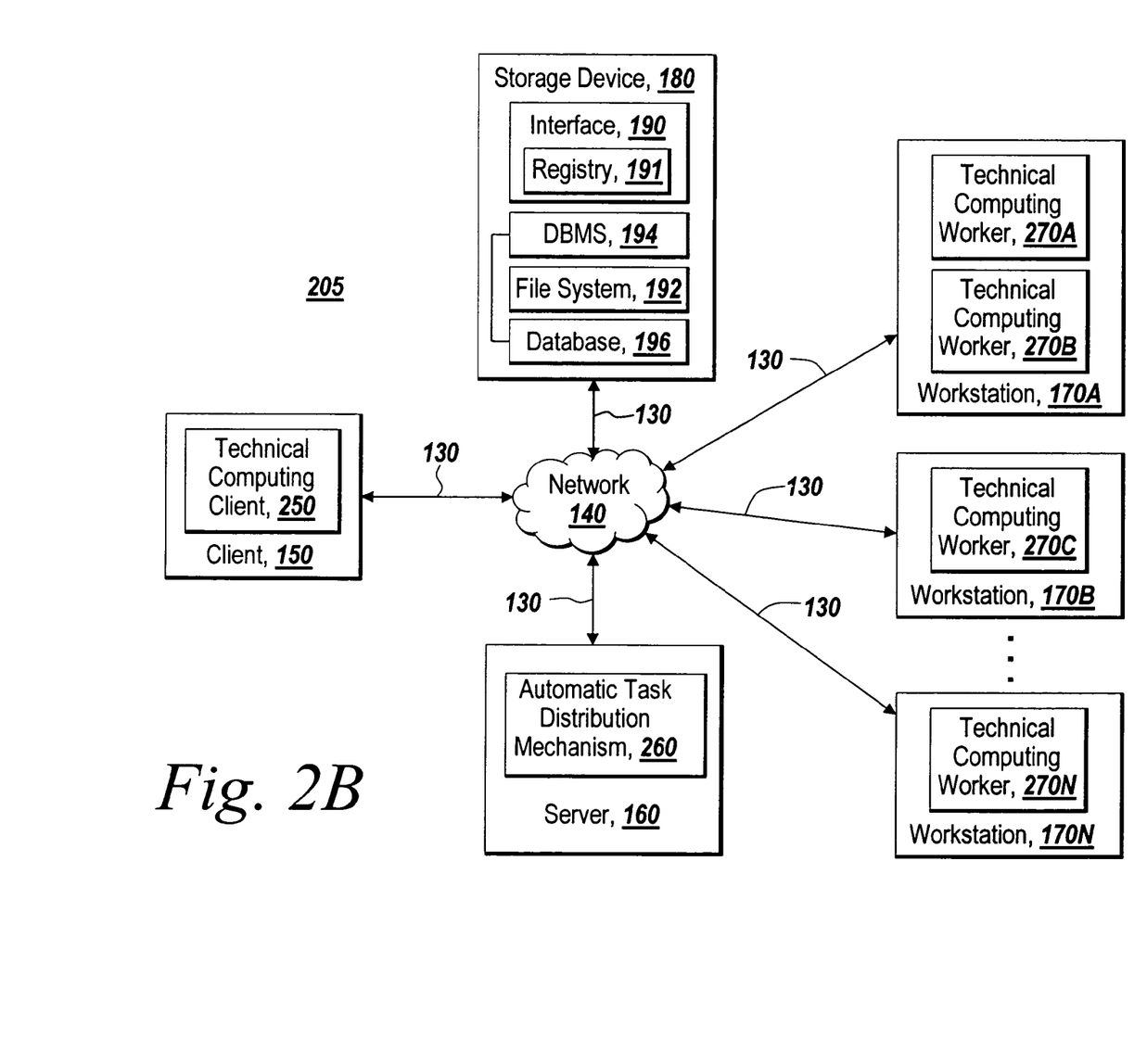
FIG. 2B is a block diagram of the components of an exemplary embodiment of the present invention in a distributed network computer system.

Referring now to FIG. 2B, an exemplary embodiment of the present invention is shown with multiple technical computing workers 270A-270N hosted on a plurality of workstations 170A-170N. The technical computing client 250 may be in communication through the network communication channel 130 on the network 140 with one, some, or all of the technical computing workers 270A-270N. In a similar manner, the interface 190 and the automatic task distribution mechanism 260 may be in communication through the network communication channel 130 on the network 140 with one, some, or all of the technical computing workers 270A-270N. As such, the technical computing client 250, the interface 190, and the automatic task distribution mechanism 260 can distribute tasks and associated data to multiple technical computing workers 270A-270N to scale the distributed system and decrease computation time of tasks. As also shown in FIG. 2C, the technical computing workers 270A-270B can be hosted on the same workstation 170A, or a single technical computing worker 270C can have a dedicated workstation 170B. Alternatively, one or more of the technical computing workers 270A-270N can be hosted on either the client 150 or the server 160.

The client machines (102, 102', 102'', 102''') depicted in FIGS. 1A and 1B can be running any operating system such as any of the versions of the Microsoft® Windows operating systems, the different releases of the Solaris, Unix and Linux operating systems, any version of the Mac OS® for Macintosh computers, any embedded operating system, any real-time operating system, any open source operating system, any proprietary operating system, any operating systems for mobile computing devices, or any other operating system capable of running on the computing device and performing the operations described herein. Furthermore, the software components of Distributed Computing Toolbox for MATLAB® and MATLAB® Distributed Computing Engine can be capable of and configured to operate on the operating system that may be running on any of the client or worker machines, respectively (e.g., 102, 102', 102'', 102''').

Additionally, each of the client 150, the server 160, and the workstation 170 can be running the same or different operating systems. For example, the client 150 can be running Microsoft® Windows, the server 160 can be running a version of UNIX, and the workstation a version of Linux. Alternatively each of the client 150, the server 160, and the workstation 170 can be running Microsoft® Windows. Additionally, the software components of Distributed Computing Toolbox for MATLAB® and MATLAB® Distributed Computing Engine can be capable of and configured to operate on and take advantage of different processors of any of the client or worker machines, respectively (e.g., 102, 102', 102'', 102'''). For example, Distributed Computing Toolbox for MATLAB® or MATLAB® Distributed Computing Engine can run on a 32 bit processor of one computing device 102 and a 64 bit processor of another computing device 102'. In a distributed system, such as the system depicted in FIG. 1B, Distributed Computing Toolbox for MATLAB® and MATLAB® Distributed Computing Engine can operate on client or worker machines, respectively (102, 102', 102'', 102''') that can be running on different processor architectures in addition to different operating systems. One ordinarily skilled in the art will recognize the various combinations of operating systems and processors that can be running on any of the client or worker machines (102, 102', 102'', and 102''').

As such, the interface 190 is configurable as an object-oriented interface that can provide or be programmed to define a set of object-oriented classes that allow a programmer to configure the interface to translate the request of the technical computing client 250 and the technical computing worker 270 into commands understandable by the database management system 194 or the file system 192. Alternatively, the set of object-oriented classes provided by the interface 190 or defined by a programmer allow the programmer to generate source code executable by an interpreter.

Although the present invention is discussed above in terms of distributing data and software components of Distributed Computing Toolbox for MATLAB® and MATLAB® Distributed Computing Engine across the computing devices of a client 150, server 160 and workstation 170, any other system and/or deployment architecture that combines and/or distributes one or more of the technical computing client 250, automatic task distribution mechanism 260 and technical computing worker 270 across any other computing devices and operating systems available in the network 140 may be used. Alternatively, all the software components of Distributed Computing Toolbox for MATLAB® can run on a single client machine 102, such as the client 150, server 160, or the workstation 170.

Those skilled in the art will appreciate the distribution of tasks and associated data among the computing devices forming the distributed computing environment can occur in a number of suitable manners. One suitable methodology is referred to as a direct distribution mode, which is intended for those users, who desire a high level of control over which technical computing worker 270 executes a particular task. Another suitable manner to distribute tasks and associated data among the computational devices of the distributed technical computing environment is often referred to as an automatic distribution mode. The automatic distribution mode provides a configuration and methodology suitable for use by a user that does not want to control which computational device of the distributed technical computing environment executes a particular task. Another suitable manner for distributing data and associated tasks is known as a batch-mode or automated distribution. The batch-mode or automated distribution allows the automatic distribution mechanism 260 to be configured to allow a user to specify a group of related tasks as a job, and to provide the batch of tasks, or the job, to the automatic task distribution mechanism 260. Those skilled in the art will also appreciate that whichever task distribution mode is selected in the distributed technical computing environment, the interface 190 connects the technical computing client 250, and the technical computing worker 270 to the file system 192 and the database 196 to manage distribution of data associated with the distributed tasks.

Referring now to FIGS. 3A-3D, an illustrative flow chart depicts steps taken by one embodiment of the present invention to distribute a task from a technical computing client 250 to a technical computing worker 270 in a distributed technical computing environment. A technical computing worker 270 registers to receive notification of one or more tasks (step 300) becoming available, or appearing, in the automatic task distribution mechanism 260. In turn, the automatic task distribution mechanism 260 registers the technical computing worker as an available worker (step 302). The technical computing client 250 defines a task comprising an operation for technical computing (step 304). The technical computing client 250 then submits the task to the automatic task distribution mechanism 260 (step 306). The automatic task distribution mechanism 260 receives the task and makes the task available for distribution to a technical computing worker 270 (step 308).

Figure 3A:
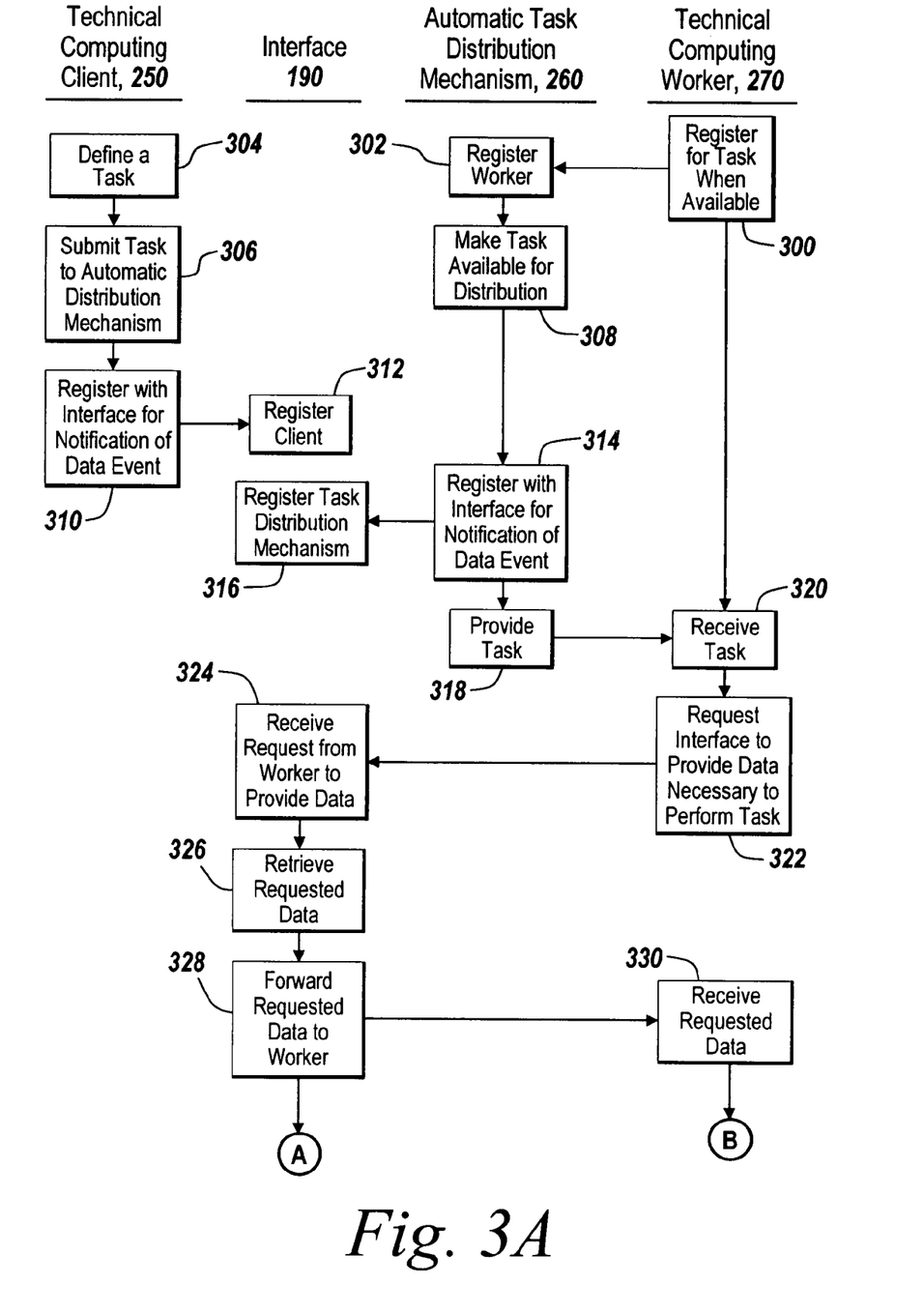
FIG. 3A is a block flow diagram illustrating steps taken to practice an exemplary embodiment of the present invention.

The technical computing client 250 registers with the registry 191 of the interface 190 for notification of desired data events (step 310). Such data events can include, but are not limited to, a change in a value of data held at a specified location in the file system 192 or the database 196, receipt of a request from a technical computing worker 270 to retrieve data, receipt of a request from a technical computing worker 270 to store data, and the like, in this manner, the technical computing client 250 is better able to track, and if desired, predict the progress and stage of a job or task. Other data events, which the technical computing client 250 can register for include, but are not limited to, notification of an occurrence of a time out in communications between the interface 190 and a technical computing worker 270; the receipt by interface 190 of corrupted data from the technical computing worker 270; notification from the interface 190 that certain data is inaccessible because another technical computing worker 270 or another technical computing client 250 is using or is intending to use the data, and the like. Other data events can indicate the interface 190 is in receipt of a request from a technical computing client 250 to register with the registry 191 for notification of certain data events. In turn, the interface 190 registers the technical computing client 250 with the registry 191 (step 312). Those skilled in the art will appreciate that the technical computing client 250 can register with the interface 190 before a task is defined, or at any time thereafter. Further, those skilled in the art will appreciate that the registry 191 can be physically or logically located outside the interface 190.

Likewise, the automatic task distribution mechanism 260 can register with the interface 190 for notification of certain data events (step 314). The data events of concern to the automatic task distribution mechanism 260 include but are not limited to those data events discussed above in relation to step 310. The interface 190 in turn registers the task distribution mechanism 260 for notification of the certain pre-defined data events (step 316). Those skilled in the art will appreciate the automatic task distribution mechanism 260 can register with the interface 190 at any time after initialization of the distributed technical computing environment. Additionally, those skilled in the art will appreciate the automatic task distribution mechanism 260 to register with the interface 190 on a per-task or per-job basis, and can register for a one-time occurrence of a task or a job or register in a manner that carries over to each current task or current job associated with the data of concern.

Figure 3B:
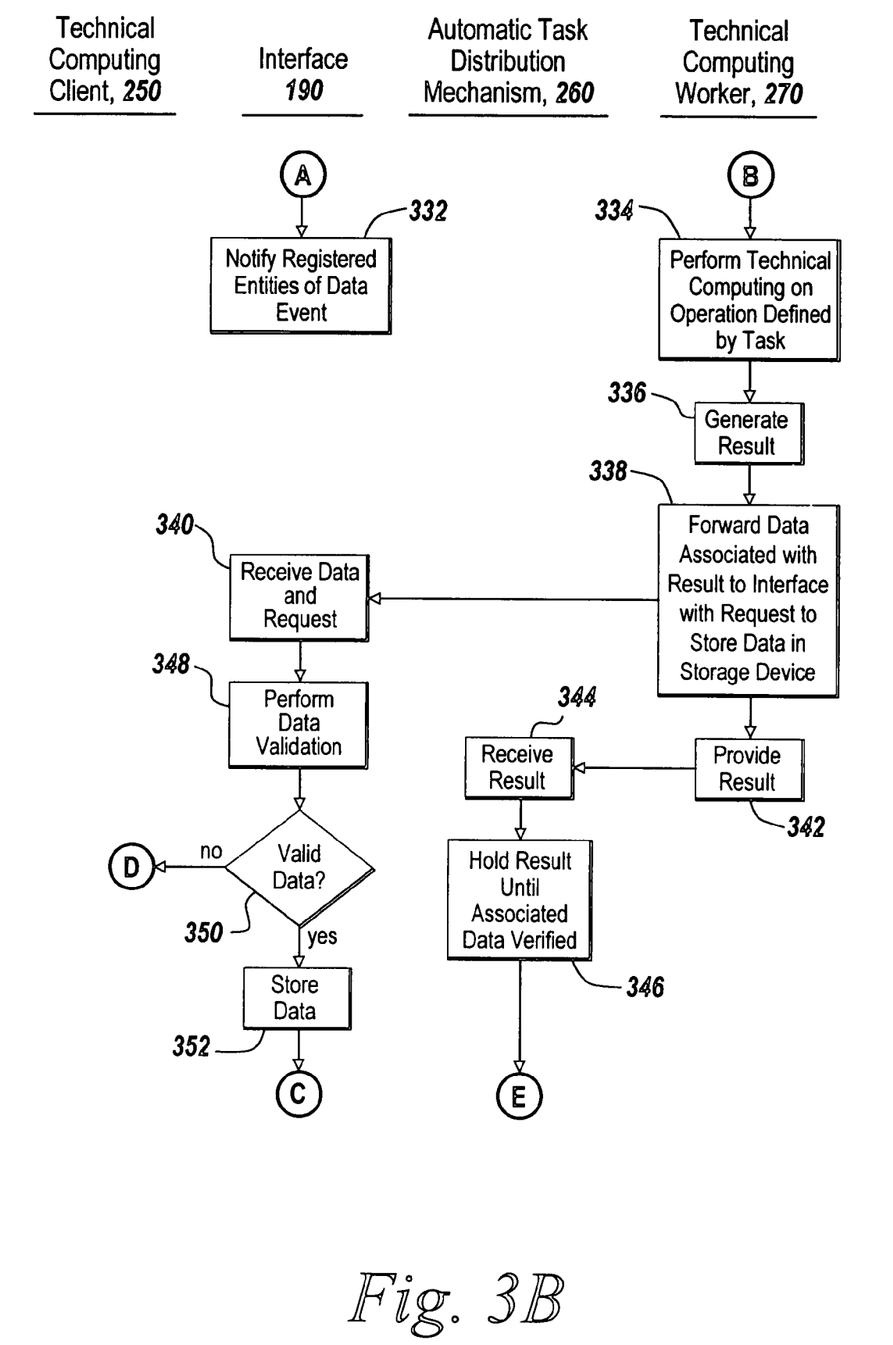
FIG. 3B is a continuation of the block flow diagram in FIG. 3A illustrating steps taken to practice an exemplary embodiment of the present invention.

The automatic task distribution mechanism 260 provides the task to the technical computing worker 270 (step 318). In turn, the technical computing worker 270 receives the task from the automatic task distribution mechanism 260 (step 320). The technical computing worker 270 examines or interrogates the received task to determine what, if any, data is required for the technical computing worker 270 to perform the received task. Upon determining the data necessary to perform the received task, the technical computing worker 270 requests the interface 190 to provide the necessary data (step 322). The interface 190 upon receipt of the request from the technical computing worker 270 (step 324) retrieves the requested data from either the file system 192 or the database 196 by invoking a method or calling a function identified in the request. The method or function can encode access request statements identified by the request into a format understandable by the file system 192 or the database management system 194 (step 326). Once the requested data is retrieved, the interface 190 forwards the requested data to the technical computing worker 270 (step 328). The technical computing worker 270 in turn receives the requested data (step 330). At this point, the interface 190 can take an action to notify those entities registered with the registry 191 to receive notification of a data request from the technical computing worker 270, or to receive notification of the forwarding of the requested data to the technical computing worker 270 and other like data events associated with receipt of a request for data from a technical computing worker, taking steps to retrieve the requested data, and forwarding the requested data to the requestor (step 332). The registered entities include any entity of the distributed technical computing environment, including, but not limited to, software components, hardware components, the technical computing client 250, the automatic task distribution mechanism 260, the technical computing worker 270, and the like.

The technical computing worker 270 can request the interface 190 to retrieve or perform another operation on the desired data in a number of suitable manners. One suitable example for the technical computing worker 270 to request the interface 190 to retrieve or perform another operation on the desired data is through a remote method invocation (RMI) that include one or more objects passed along with the request that include information for retrieving the desired data. The information included in the one or more objects can include a method with statements to send or construct structured query language (SQL) statements to the database management system 194. Another suitable method for the technical computing worker 270 to request the interface 190 to retrieve the desired data is through a remote procedure called (RPC). Another suitable method for the technical computing worker 270 to request the interface 190 to retrieve or perform another operation with the desired data is via a function call to a function associated with the interface 190. Those skilled in the art will appreciate that other entities of the distributed technical computing environment, for example the technical computing client 250 and the automatic task distribution mechanism 260 can communicate with the interface 190 in any of the just described manners.

Figure 3C:
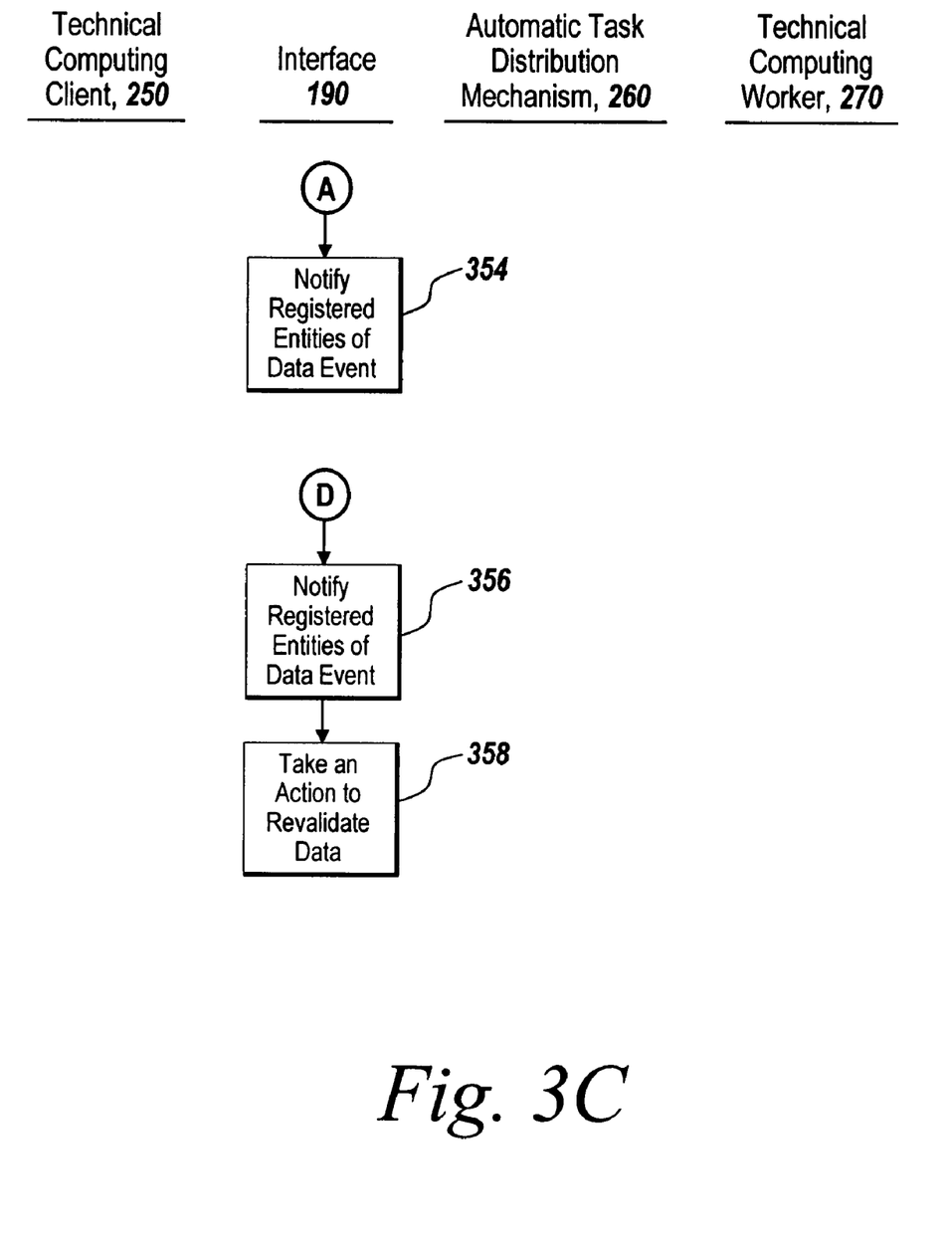
FIG. 3C is a continuation of the block flow diagram in FIGS. 3A and 3B illustrating steps taken to practice an exemplary embodiment of the present invention.

The technical computing worker 270 performs the requested technical computing on the function or command as defined by the task (step 334). In performing the technical computing on the task, an associated result is likely generated (step 336). Those skilled in the art will appreciate that in some instances, either no result is generated or the result is not required to be returned to the technical computing client 250.

After generating the result from computing the task, the technical computing worker 270 forwards data associated with the task or the result of the task or both to the interface 190 with a request to store the data or perform some other operation on the data, in either the file system 192 or the database 196 (step 338). The interface 190 receives the data and the request from the technical computing worker 270 (step 340). If configured to do so, the interface 190 performs data validation on the received data to at least validate the data has a proper format and is comprehensible (step 348). That is, the interface 190 can be configured to interrogate the received data to determine which values changed since forwarding the data to the technical computing worker 270, and to further determine if the data received from the technical computing worker 270 conforms to the requirement specified for that data. For example, the interface 190 can determine if the data is the appropriate data type, is of the appropriate length, and the like. If the interface 190 determines the data is valid (step 350), the interface 190 stores the data in either the file system 192 or the database 196 at the appropriate storage location (step 352). If the interface 190 determines the data is not valid, for example, the data is considered corrupted because it does not conform to a pre-defined format for the data (step 350), the interface 190 can notify entities registered with the registry 191 to receive notification if such a data event occurs (step 356). Those skilled in the art will appreciate that the interface 190 can perform other data validation operations such as verification of a checksum or a CRC, and other like data validation operations.

Figure 3D:
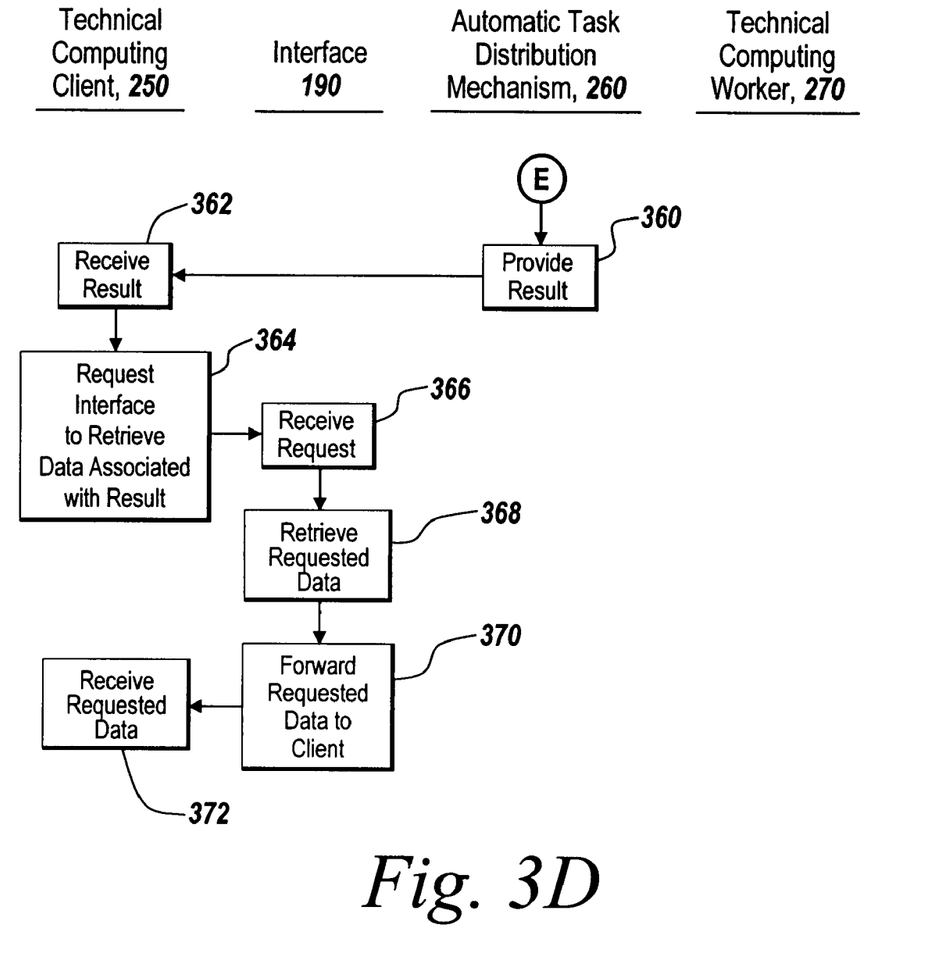
FIG. 3D is a continuation of the block flow diagram in FIGS. 3A, 3B, and 3C illustrating steps taken to practice an exemplary embodiment of the present invention.

After generating the result from computing the task, the technical computing worker 270 provides the result to the automatic task distribution mechanism 260 (step 342). After obtaining the result from the technical computing worker 270 (step 344), the automatic task distribution mechanism 260 can hold the result until the interface 190 validates the data (step 346). As such, the automatic task distribution mechanism 260 is configurable to hold the result until the interface 190 validates the data. If the automatic task distribution mechanism is configured in this manner, it holds the result until notified by the interface 190 the data is valid (step 346). Otherwise, the automatic task distribution mechanism 260 provides the result to the technical computing client 250 (step 360). The technical computing client 250 receives the result provided by the automatic task distribution mechanism 260 (step 362).

The technical computing client 250 requests the interface 190 to retrieve the data associated with the results from either the file system 192 or the database 196 (step 364). The interface 190 receives the request (step 366), and in response retrieves the requested data (step 368). The interface 190 after retrieving the requested data forwards the data to the technical computing client 250 (step 370), and the technical computing client 250, in turn, receives the requested data (step 372).

Many alterations and modifications may be made by those having ordinary skill in the art without departing from the spirit and scope of the invention. For example, the present invention is well suited for use with any scheduler or job manager including, but not limited to schedulers such as, LSF, PBS, HTC type schedulers, such as Condor, Microsoft Cluster Manager, and the like Therefore, it must be expressly understood that the illustrated embodiments have been shown only for the purposes of example and should not be taken as limiting the invention, which is defined by the following claims. These claims are to be read as including what they set forth literally and also those equivalent elements which are insubstantially different, even though not identical in other respects to what is shown and described in the above illustrations.

What is claimed is:

1. A method for managing and handling data in a distributed computing environment wherein a client submits a task performed by one or more workers, the method comprising:
   receiving task data from the client;
   storing the task data in a data repository, the data repository communicatively coupled to:
      the client,
      the one or more workers, and
      an automatic task distribution mechanism, where the automatic task distribution mechanism distributes tasks from the client to one or more of the workers without requiring that the client have knowledge about the one or more workers;
   registering the automatic task distribution system in a registry which is part of an interface, the interface receiving application programming interface (API) calls from the client or the workers;
   determining task information using the registry, the task information indicating whether processing of the task is complete or whether the task is being performed; and performing load balancing among the workers based on the task information.

2. The method of claim 1, whereby performance of the client's task generates result data, and the method further comprises:
receiving the result data from the worker;
storing the result data in the data repository;
receiving a request for the result data from the client; and
providing the result data from the data repository to the client in response to receiving the request for the result data.

3. The method of claim 2, further comprising:
validating the received result data prior to storing the received result data in the data repository.

4. The method of claim 2, further comprising:
translating a request for data from the data repository from an entity in the distributed computing environment into commands compatible with the data repository.

5. The method of claim 2, further comprising:
notifying the client that result data was stored in the data repository.

6. The method of claim 2, further comprising:
notifying the client that task data was provided to the worker.

7. The method of claim 2, further comprising:
notifying a scheduler of an event relating to the task data or the result data.

8. The method of claim 2, further comprising:
receiving a request from the worker to perform an operation on the task data, the request to perform an operation on the task data received before the request from the worker for the task data; and
performing the operation on the task data in response to receiving the request to perform the operation on the task data.

9. The method of claim 2, further comprising:
receiving a request to register a first entity of the distributed computing environment to receive notifications of desired data events; and
registering the first entity to receive notifications of the desired data events.

10. The method of claim 9, wherein the desired data events comprises at least one of a change in value of data stored in the data repository, a change of a data type of data stored in the data repository, a change in a dimension of data stored in the data repository, a receipt of a request for data stored in the data repository from a second entity of the distributed computing environment, a receipt of a request from the second entity to store data, a receipt of corrupted data from the second entity, a determination that data in the data repository is inaccessible, a determination that the data repository is nearing storage capacity and an occurrence of a time out of a communication between the data repository and the second entity.

11. The method of claim 9, wherein the entity is the client, the request to register is for receipt of notifications of data events about the client's task, and the request to register is received before the task data is received from the client.

12. The method of claim 9, wherein the entity is the client, the request to register is for receipt of notifications of data events about the client's task, and the request to register is received after the task data is received from the client.

13. A non-transitory computer-readable medium having computer-executable instructions for performing a method for managing and handling data in a distributed computing environment wherein a client submits a task performed by one or more workers, the method comprising:
receiving task data from the client;
storing the task data in a data repository, the data repository communicatively coupled to:
the client,
the one or more workers, and
an automatic task distribution mechanism, where the automatic task distribution mechanism distributes tasks from the client to one or more of the workers without requiring that the client have knowledge about the one or more workers;
registering the automatic task distribution system in a registry which is part of an interface, the interface receiving application programming interface (API) calls from the client or the workers;
determining task information using the registry, the task information indicating whether processing of the task is complete or whether the task is being performed; and
performing load balancing among the workers based on the task information.

14. The medium of claim 13, the method further comprising:
receiving the result data from the worker;
storing the result data in the data repository;
receiving a request for the result data from the client; and
providing the result data from the data repository to the client.

15. The medium of claim 14, the method further comprising:
validating the received result data prior to storing the received result data in the data repository.

16. The medium of claim 14, the method further comprising:
translating a request for data from the data repository from an entity in the distributed computing environment into commands compatible with the data repository.

17. The medium of claim 14, the method further comprising:
notifying the client that result data was stored in the data repository.

18. The medium of claim 14, the method further comprising:
notifying the client that task data was provided to the worker.

19. The medium of claim 14, the method further comprising:
notifying a scheduler of an event relating to the task data or the result data.

20. The medium of claim 14, the method further comprising:
receiving a request from the worker to perform an operation on the task data, the request to perform an operation on the task data received before the request from the worker for the task data; and
performing the operation on the task data in response to receiving the request to perform the operation on the task data.

21. The medium of claim 14, the method further comprising:
receiving a request to register a first entity of the distributed computing environment to receive notifications of desired data events; and
registering the first entity to receive notifications of the desired data events.

22. The medium of claim 21, wherein the desired data events comprises at least one of a change in value of data stored in the data repository, a change of a data type of data stored in the data repository, a change in a dimension of data stored in the data repository, a receipt of a request for data stored in the data repository from a second entity of the distributed computing environment, a receipt of a request from the second entity to store data, a receipt of corrupted data from the second entity, a determination that data in the data repository is inaccessible, a determination that the data repository is nearing storage capacity and an occurrence of a time out of a communication between the data repository and the second entity.

23. The medium of claim 21, wherein the entity is the client, the request to register is for receipt of notifications of data events about the client's task, and the request to register is received before the task data is received from the client.

24. The medium of claim 21, wherein the entity is the client, the request to register is for receipt of notifications of data events about the client's task, and the request to register is received after the task data is received from the client.

25. A storage device for managing and handling data associated with tasks to be performed in a distributed computing environment, comprising:
   a data repository, the data repository communicatively coupled to:
      a plurality of clients,
      a plurality of workers, and
      an automatic task distribution mechanism, where the automatic task distribution mechanism distributes tasks from one or more of the plurality of clients to one or more of the plurality of workers without requiring that the one or more of the plurality of clients have knowledge about the one or more of the plurality of workers receiving the tasks; and
   an interface for:
      registering the automatic task distribution system in a registry which is part of the interface, the interface receiving application programming interface (API) calls from the client or the workers, and
      providing task information indicating whether processing of the task is complete or whether the task is being performed, the automatic task distribution system performing load balancing among the workers based on the task information.

26. The storage device of claim 25, wherein the data repository includes at least one of a file system and a database.

27. The storage device of claim 25, wherein a client in the distributed computing environment operates on a first platform and a worker in the distributed computing environment operates on a second platform, where the first platform is different from the second platform; and
   wherein the interface manages incompatibilities between the first platform and the second platform.

28. The storage device of claim 25, wherein the interface registers a client in the distributed computing environment for notifications of data events related to a task before the task has been defined by the client.

29. The storage device of claim 25, wherein the interface registers a client in the distributed computing environment for notifications of data events related to a task after the task has been defined by the client.

30. The storage device of claim 25, wherein the interface registers a scheduler in the distributed computing environment for notifications of data events related to a task on a per-task basis.

31. The storage device of claim 25, wherein the interface is configured as an object-oriented interface.

32. The storage device of claim 25, further comprising registering entities in the distributed computing environment, where the registering identifies entities in the distributed computing environment that request to receive notifications of desired data events, wherein the notification of desired data events is associated with at least one of:
   a change in value of data stored in the data repository,
   a change of a data type of data stored in the data repository,
   a change in a dimension of data stored in the data repository,
   a receipt of a request for data stored in the data repository from an entity in the distributed computing environment,
   a receipt of a request from an entity in the distributed computing environment to store data, a receipt of corrupted data from an entity in the distributed computing environment,
   a determination that data in the data repository is inaccessible,
   a determination that the data repository is nearing storage capacity, and
   an occurrence of a time out of a communication between the data repository and an entity in the distributed computing environment.

* * * * *